United States Patent [19]
Eda

[11] Patent Number: 5,785,874
[45] Date of Patent: Jul. 28, 1998

[54] OPTICAL WAVEGUIDE DEVICE BONDED THROUGH DIRECT BONDING AND A METHOD FOR FABRICATING THE SAME

[75] Inventor: Kazuo Eda, Nara, Japan

[73] Assignee: Matsushita Electric Industrial Co., Ltd., Osaka, Japan

[21] Appl. No.: 511,554

[22] Filed: Aug. 4, 1995

Related U.S. Application Data

[62] Division of Ser. No. 389,070, Feb. 14, 1995, Pat. No. 5,485,540, which is a continuation of Ser. No. 153,148, Nov. 15, 1993, abandoned.

[30] Foreign Application Priority Data

| Nov. 16, 1992 | [JP] | Japan | 4-304298 |
| Nov. 16, 1992 | [JP] | Japan | 4-304299 |
| Nov. 16, 1992 | [JP] | Japan | 4-304300 |

[51] Int. Cl.$^6$ .................................................. B29D 11/00
[52] U.S. Cl. ............................... 216/24; 216/52; 216/97; 156/99
[58] Field of Search ............................... 216/24, 52, 97; 156/99

[56] References Cited

U.S. PATENT DOCUMENTS

| 4,092,060 | 5/1978 | Nunoshita et al. | 385/16 |
| 4,403,825 | 9/1983 | Tangonan et al. | 385/130 |
| 4,582,390 | 4/1986 | Furuya . | |
| 4,615,962 | 10/1986 | Gorito | 430/20 |
| 4,772,787 | 9/1988 | Trommer . | |
| 4,851,025 | 7/1989 | Siefert et al. | 216/24 |
| 5,070,488 | 12/1991 | Fukushima et al. | 385/16 |
| 5,113,469 | 5/1992 | Hatakoshi et al. | 385/122 |
| 5,122,852 | 6/1992 | Chan et al. | 437/126 |
| 5,125,065 | 6/1992 | Stoll et al. | 385/130 |

(List continued on next page.)

FOREIGN PATENT DOCUMENTS

| 0192850 | 9/1986 | European Pat. Off. . |
| 0420173 | 4/1991 | European Pat. Off. . |
| 0503892A1 | 9/1992 | European Pat. Off. . |
| 0575948A1 | 12/1993 | European Pat. Off. . |
| 52-23355 | 2/1977 | Japan . |
| 56-131219 | 10/1981 | Japan . |
| 59-67710 | 4/1984 | Japan . |
| 63-261219 | 10/1988 | Japan . |
| 1-189614 | 7/1989 | Japan . |

(List continued on next page.)

OTHER PUBLICATIONS

European Search Report dated Jan. 4, 96.
P. Barnes, "Phase Modulation of Light in Planar Electrooptical Waveguides", *Siemens Forschungs–Und Entwicklungs–Berichte*, vol. 5, No. 3, pp. 153–155 (1976).
R.C.Alferness, "Waveguide Electrooptic Modulators", *IEEE Transactions On Microwave Theory and Techniques*, vol. MTT-30, No. 8, pp. 1121–1137 (Aug. 1982).
I.P. Kaminow, "Optical Waveguide Modulators", *IEEE Transactions On Microwave Theory and Techniques*, vol. MTT-23, No. 1, pp. 57–70 (Jan. 1975).
Kersten et al., "Multimode integrated optics using dielectric and hollow metallic waveguides", *Optics Communications*, vol. 36, No. 1, (Jan. 1981), Amsterdam.
Alferness, "Waveguide Electrooptic Modulator", *IEEE Transactions on Microwave Theory and Techniques*, vol. MTT-30, No. 8, (Aug. 1982).

(List continued on next page.)

*Primary Examiner*—Roland Martin
*Attorney, Agent, or Firm*—Ratner & Prestia

[57] ABSTRACT

An optical waveguide device including a support substrate, a glass substrate, and a thin film layer formed on at least one of the substrates, if required. The support substrate and the glass substrate are bonded through direct bonding, and the glass substrate includes an optical waveguide as a part thereof. A layer having a refractive index lower than that of the glass substrate may be formed on the glass substrate. A method for fabricating such an optical waveguide device is also provided.

5 Claims, 10 Drawing Sheets

U.S. PATENT DOCUMENTS

| | | | |
|---|---|---|---|
| 5,157,748 | 10/1992 | Mueller et al. | 385/41 |
| 5,185,830 | 2/1993 | Nishimoto | 385/41 |
| 5,193,137 | 3/1993 | Hoshino et al. | 385/129 |
| 5,281,305 | 1/1994 | Lee et al. | 216/97 |
| 5,417,804 | 5/1995 | Nishihara et al. | 216/24 |

FOREIGN PATENT DOCUMENTS

| | | |
|---|---|---|
| 3-35203 | 2/1991 | Japan . |
| 3-75608 | 3/1991 | Japan . |
| 4-283957 | 10/1992 | Japan . |
| 2191603 | 12/1987 | United Kingdom . |

OTHER PUBLICATIONS

Kaminow, "Optical Waveguide Modulators", IEEE Transactions on Microwave Theory and Techniques, vol. MTT–23, No. 1, (Jan. 1975), pp. 57–70.

W.P. Maszara et al., "Bonding of Silicon Wafers for Silicon–on–Insulator", *Journal of Applied Physics*, vol. 64, No. 10, pp. 4943–4950 (Nov. 15, 1988.

G.T. Reed, et al., "Silicon on Insulator Optical Waveguides Formed by Direct Waver Bonding", *Materials Science and Engineering*, vol. B15, No. 2, pp. 156–159 (Nov. 1, 1992).

OPTICAL WAVEGUIDE DEVICE BONDED THROUGH DIRECT BONDING AND A METHOD FOR FABRICATING THE SAME

This application is a division of application Ser. No. 08/389,070, filed Feb. 14, 1995, now U.S. Pat. No. 5,485,540, which is a continuation of Ser. No. 08/153,148, filed Nov. 15, 1993 (status: abandoned).

BACKGROUND OF THE INVENTION

1. Field of the Invention

The present invention relates to an optical waveguide device in which a glass optical waveguide is integrally formed on a dielectric or semiconductor substrate.

2. Description of the Related Art

As optical waveguide devices, there are conventionally known an optical waveguide serving as a passage for light transmission, an optical modulator for modulating the intensity and phase of light propagating in the optical waveguide (hereinafter, such light is referred to as waveguide light), an optical switch for switching on/off the waveguide light, a waveguide type optical amplifier for amplifying light, and an optical phase matching device.

These conventional optical waveguide devices are described, for example, in R. Alferness, "Waveguide Electrooptic Modulators", IEEE Transactions on Microwave and Techniques, Vol. MTT-30, No. 8 pp. 1121–1137 (1982).

These optical waveguide devices are fabricated by forming an optical waveguide on a dielectric substrate, a glass substrate, or a semiconductor substrate. I. Kaminow, "Optical Waveguide Modulators", IEEE Transactions on Microwave and Techniques, Vol. MTT-23, No. 1, pp. 57–70 (1975) describes various conventional methods for fabricating these optical waveguide devices.

For example, the above mentioned document describes fabricating methods in which an optical waveguide is formed on a dielectric substrate, especially a dielectric substrate having an electrooptic effect. Examples of these methods include: a method in which Ti is diffused in a substrate made of lithium niobate or the like and the Ti-diffused portion is used as the optical waveguide; a method in which a crystal of lithium niobate is grown on a substrate made of lithium tantalate by epitaxy and the crystal is used as the optical waveguide; and a method in which a thin film of lithium niobate is formed on a substrate made of lithium niobate or lithium tantalate by sputtering and the thin film is used as the optical waveguide.

The optical waveguide device fabricated as described above using a dielectric substrate is advantageous in that it responds at high speed and that the electrical control of the waveguide light is easy. It is therefore used as a high-speed optical modulator. However, since the shape, size, and diffractive index of the optical waveguide at its coupling portion greatly differs from those of an optical fiber to be coupled, the loss of light at the coupling of the optical waveguide with the optical fiber (hereinafter, referred to as the "coupling loss") is great.

Other methods for fabricating the optical waveguide device in which an optical waveguide made of glass or quartz is formed on a semiconductor substrate or other various types of substrates are also known. Examples of these methods include: a method in which a silicon oxide film is formed on a semiconductor substrate made of Si by thermal oxidation and then an optical waveguide is formed on the silicon oxide film; and a method in which glass or quartz material is deposited on an Si substrate by various thin film technologies such as sputtering, vacuum evaporation, chemical vapor deposition, flame hydrolysis deposition, and sol-gel transformation, and then an optical waveguide is formed on the deposited glass or quartz layer.

For example, Japanese Laid-Open Patent Publication No. 1-189614 discloses a structure fabricated by a flame hydrolysis deposition method which includes the steps of: forming a clad layer made of glass or the like having a refractive index lower than an optical waveguide to be formed in a later step, forming a layer (core portion) made of glass or quartz material having a refractive index higher than the clad layer on the clad layer, and, if required, forming another clad layer having a refractive index lower than the core portion on the core portion, thereby controlling the confinement of light into the core portion. This structure allows light to be substantially completely confined in the core portion, and thus can be used as an optical waveguide device.

The above optical waveguide device fabricated by the thin film technology has problems as follows:

(1) Using glass or quartz material for the optical waveguide is preferable because, in general, the loss of light during the propagation decreases as the purity and the solidity of the material are higher. However, in the thin film technology described above, it is generally difficult to control the quality and refractive index of a resultant thin film. Accordingly, it is difficult to obtain a core portion with a low loss of light during the propagation.

(2) When the optical waveguide is coupled with an optical fiber, the coupling loss is smaller as the shape and refractive index of the optical waveguide are closer to those of the optical fiber. However, the core diameter of a single-mode optical fiber is in the order of 10 μm, and any thin film technology finds it difficult to form a high-quality, uniform thin film having a thickness as large as 10 μm. Moreover, even when a material of the same composition as that of the optical fiber is used for the thin film, the refractive index of such a thin film formed by the thin film technology is not necessarily identical to that of the core portion of the optical fiber formed by the glass formation technology including melting and solidifying. Accordingly, it is difficult to match the refractive indices therebetween. Furthermore, forming a thicker film by the thin film technology results in low productivity. In addition, since the variation of materials available for the thin film is greatly limited, the function and design for the optical waveguide is limited.

The fabricating method using the silicon oxide film formed on the Si substrate by thermal oxidation also has a problem. Since the oxide film is formed at a rate of 0.1 μm/hour at 1000° C., it takes a long time to form a thick film, which also lowers the productivity.

U.S. Pat. No. 5,193,137 discloses a structure in which a glass optical waveguide is formed on a glass substrate. More specifically, 2 quartz glass core portion is formed on a quartz glass substrate with a glass layer having a low refractive index interposed therebetween.

The above glass optical waveguide device is advantageous in that, since the shape, size, and refractive index thereof can be easily matched with those of an optical fiber, the coupling loss of the optical waveguide with a typical quartz optical fiber can be reduced. However, since glass itself does not have the electrooptic effect, the electrical control of the waveguide light is impossible by this glass optical waveguide device. To overcome this problem, there is proposed a method of controlling the waveguide light by using a change in the refractive index caused by heating or the like. However, the response speed of the resultant device is critically low compared with that of the device using the electrooptic effect.

There is also known a glass optical waveguide device in which an optical waveguide is formed by changing the refractive index by diffusing metal. In such a device, however, the shape at the coupling portion of the optical waveguide is less symmetrical, and therefore is not so effective in reducing the coupling loss with the optical fiber. Moreover, in the optical waveguide formed by metal diffusion, the loss of light during the propagation increases due to the diffused metal.

SUMMARY OF THE INVENTION

The optical waveguide device of the present invention includes: a support substrate and a glass substrate bonded through direct bonding with the support substrate, wherein the glass substrate includes an optical waveguide as part thereof.

According to another aspect of the present invention, the optical waveguide device includes: a support substrate, a glass substrate, and a thin film layer formed on a surface of at least one of the support substrate and the glass substrate, wherein the support substrate and the glass substrate are bonded through direct bonding with each other through the thin film layer, and the glass substrate includes an optical waveguide as part thereof.

In one embodiment of the invention, the support substrate is a dielectric substrate.

In another embodiment of the invention, the dielectric substrate has an electrooptic effect.

In another embodiment of the invention, the dielectric substrate is made of lithium niobate or lithium tantalate.

In another embodiment of the invention, the support substrate is a glass substrate.

In another embodiment of the invention, the support substrate is a semiconductor substrate.

In another embodiment of the invention, the semiconductor substrate is made of silicon.

In another embodiment of the invention, the semiconductor substrate is made of a III–V group compound semiconductor.

In another embodiment of the invention, the semiconductor substrate is made of GaAs.

In another embodiment of the invention, the semiconductor substrate is made of InP.

In another embodiment of the invention, the thin film layer is a silicon layer.

In another embodiment of the invention, the thin film layer is a silicon compound layer.

In another embodiment of the invention, the silicon compound layer is made of silicon oxide.

In another embodiment of the invention, the silicon compound layer is made of silicon nitride.

In another embodiment of the invention, the refractive index of the thin film layer is lower than that of the glass substrate.

In another embodiment of the invention, the silicon layer is made of amorphous silicon.

In another embodiment of the invention, the silicon layer is made of polysilicon.

In another embodiment of the invention, a layer having a refractive index lower than that of the glass substrate is formed on a surface of the glass substrate, and the layer is bonded through direct bonding with the support substrate.

In another embodiment of the invention, a layer having a refractive index lower than that of the glass substrate is formed on a surface of the glass substrate, and the layer is bonded through direct bonding with the support substrate.

In another embodiment of the invention, the support substrate and the optical waveguide in the glass substrate are optically coupled with each other.

In another embodiment of the invention, the support substrate and the optical waveguide in the glass substrate are optically coupled with each other.

In another embodiment of the invention, the optical coupling between the support substrate and the optical waveguide in the glass substrate is effected by an optical directional coupler composed of the optical waveguide in the glass substrate and an optical waveguide formed in the support substrate.

In another embodiment of the invention, the optical coupling between the support substrate and the optical waveguide in the glass substrate is effected by an end reflecting portion formed at the optical waveguide in the glass substrate.

In another embodiment of the invention, an optical device is formed in the support substrate.

In another embodiment of the invention, an electronic device and/or an optical device is formed in the semiconductor substrate.

In another embodiment of the invention, the refractive index of the glass substrate as the support substrate is lower than that of the glass substrate having the optical waveguide.

The method for fabricating an optical waveguide device of the invention includes the steps of: providing a support substrate having a first surface and a second surface opposing each other and a glass substrate having a first surface and a second surface opposing each other; exposing at least one of the first surface of the support substrate and the second surface of the glass substrate to a hydrophilic treatment; attaching the first surface of the support substrate and the second surface of the glass substrate to each other; heating the attached support substrate and the glass substrate; thinning the glass substrate; and forming an optical waveguide in the thinned glass substrate.

In one embodiment of the invention, the method for fabricating an optical waveguide device further includes before the hydrophilic treatment a step of: forming a thin film layer on at least one of the first surface of the support substrate and the second surface of the glass substrate.

In another embodiment of the invention, the thin film layer is a silicon layer or a silicon compound layer.

Thus, the invention described herein makes possible the advantages of (1) providing an optical waveguide device with a reduced loss of light during the propagation and a reduced loss of light at coupling thereof with an optical fiber which is capable of being integrated with other optical device and electronic device, and (2) providing a method for fabricating such an optical waveguide device.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the accompanying drawings as follows.

EXAMPLE 1

Figure 1:
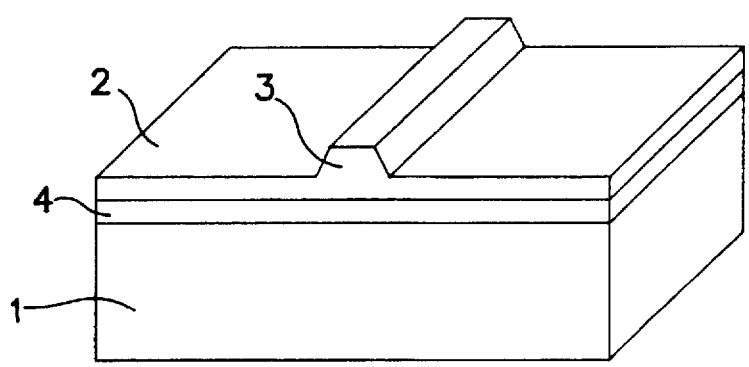
FIG. 1 is a structural view of a first example of the optical waveguide device according to the present invention.

A first example of the optical waveguide device according to the present invention is shown in FIG. 1. Referring to FIG. 1, an optical waveguide device of this example comprises a support substrate 1 and a glass substrate 2. The glass substrate 2 includes an optical waveguide portion 3 as part thereof on one surface. A low refractive index layer 4 is a glass layer or other thin film formed in advance on the other surface of the glass substrate 2, and has a refractive index lower than that of the glass substrate 2. The low refractive index layer 4 can be formed by a conventional thin film technology. The low refractive index layer 4 is bonded through direct bonding with a support substrate 1.

Figure 2A:
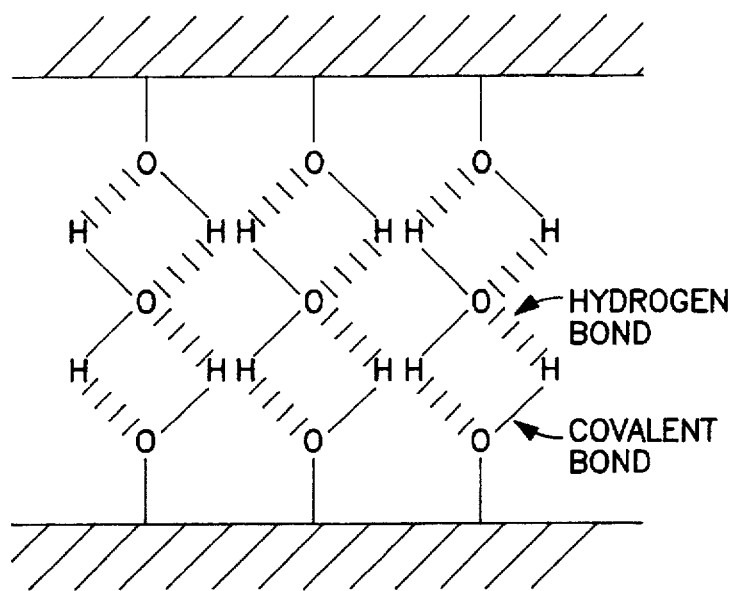
FIGS. 2A to 2C are models illustrating the mechanism of the direct bonding according to the present invention.
Figure 2B:
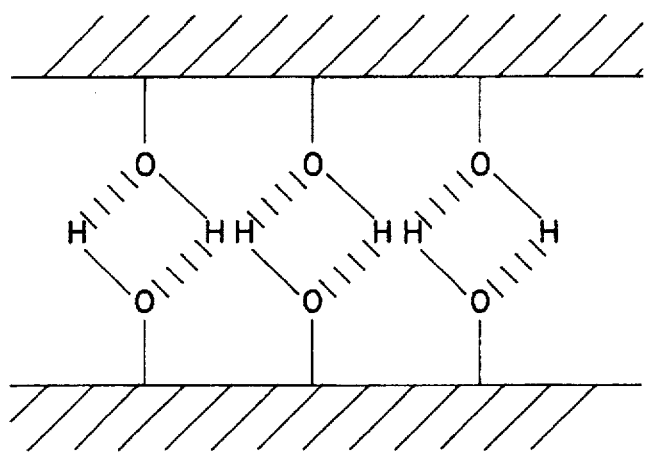
Figure 2C:
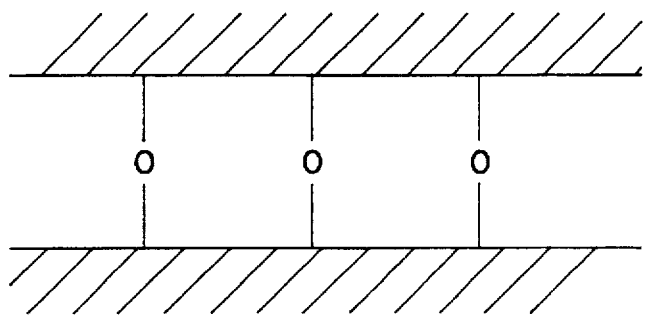

Referring to FIGS. 2A to 2C, the direct bonding will be described.

When surfaces of substrates are sufficiently cleaned, being subjected to a hydrophilic treatment, and immersed in pure water, a number of hydroxyl groups are formed on the surfaces of the substrates, as shown in FIG. 2A. The hydroxyl groups on the surfaces generally have a large dipole moment. When the substrates are attached to each other under this condition, they are firmly bonded through direct bonding by the hydrogen bond formed among the hydroxyl groups. Water molecules adsorbed onto the surface hydroxyl groups may bridge this bonding. The density of the surface hydroxyl groups generated by the hydrophilic treatment, the amount of adsorbed water, and the magnitude of the dipole moment of the surface hydroxyl groups depend upon the materials of the substrates to be treated.

When the bonded substrates are heated, the adsorbed water molecules are gradually desorbed from the bonded interface, as shown in FIG. 2B. As the heating temperature rises, the water molecules are further desorbed to form the hydrogen bond between the surface hydroxyl groups and the hydroxyl groups are increasingly condensed to form the covalent bond, which further strengthens the bonding. The temperature at which the adsorbed water is desorbed and that at which the hydroxyl groups are condensed depend upon the magnitude of the dipole moment of the surface hydroxyl groups etc., which in turn depends upon the materials of the substrates. The hydrogen bond and the covalent bond may coexist as shown in FIGS. 2A to 2C.

The strength of the direct bonding depends upon the materials to be bonded as described above. After intensive studies on direct bonding for various materials, it has been found that various types of dielectric and semiconductor substrates can be bonded through direct bonding with a glass substrate having a bonding strength durable to a practical use by treating the surfaces thereof in the above-described manner; that is, cleaning the surfaces of the substrates, exposing the surfaces to an appropriate hydrophilic treatment, immersing the treated surfaces in pure water, attaching the treated surfaces to each other, and then heating the interface. The hydrophilic treatment may be effected on only one of the surfaces to be bonded. As for a glass substrate which contains silicon capable of forming a strong covalent bond, the bonding strength is greater than substrates made of other materials. For example, the glass substrate with the bonding strength as great as several tens of kilograms per $cm^2$ can be obtained with excellent reproducibility when the interface is heated at 300° C. for approximately one hour.

The bonded interface has been observed by a transmission electron microscope (TEM). As a result, it has been found that the atom-level bonding has been achieved at the interface. No light scattering has been observed at the bonded interface.

The above-described bonding is called the direct bonding because the bonding at the interface is achieved at the atom level and no additional material exists at the interface.

The optical waveguide portion 3 which is a portion of the glass substrate 2 has a thickness a little greater than the other portion thereof. The effective refractive index of the optical waveguide portion 3 is therefore greater than the other thinner portion, so that light is confined in the optical waveguide portion 3 which can thus serve as the optical waveguide.

The above-described optical waveguide device was fabricated using the materials and conditions as follows:

Lithium niobate or lithium tantalate substrate which is a dielectric substrate having the electrooptic effect was used as the support substrate 1. High-purity quartz glass substrate having a refractive index of approximately 1.45 for light having a wavelength band of 1.5 μm was used as the glass substrate 2. Glass having a low refractive index, silicon oxide, or silicon nitride having a refractive index as low as approximately 1.4 for the same wavelength band formed by sputtering, chemical vapor deposition, or the like was used as the low refractive index layer 4. The thicknesses of the support substrate 1, the low refractive index layer 4, the glass substrate 2 except the optical waveguide portion 3, and the optical waveguide portion 3 were 450 μm, 2 μm, 4 μm, and 10 μm, respectively.

The loss of light during the propagation of the resultant optical waveguide device was 0.05 dB/cm or less. The coupling loss at the coupling of the optical waveguide with an optical fiber was also measured by using a single-mode optical fiber having a core diameter of 10 μm. The result was as low as 0.5 dB or less.

When an adhesive agent is used for the bonding, but not the direct bonding, since the thickness of the adhesive agent cannot be precisely controlled, the bonded surfaces become less flat. As a result, the glass substrate and the dielectric substrate cannot be processed with high precision. Moreover, since an organic adhesive agent is less resistant against heat and chemicals, post-bonding processes allowable for the glass substrate and the dielectric substrate are limited. These problems are solved by using the direct bonding according to the present invention. Further, the optical waveguide device fabricated using the direct bonding is excellent in reliability.

EXAMPLE 2

Figure 3:
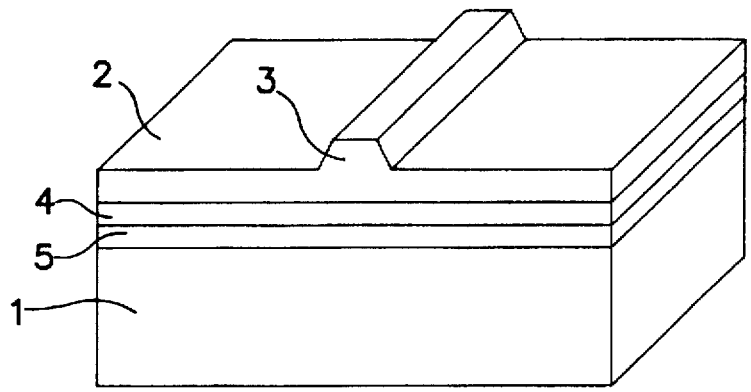
FIGS. 3 to 21 are structural views of second to twentieth examples of the optical waveguide device according to the present invention, respectively.

A second example of the optical waveguide device according to the present invention is shown in FIG. 3. Referring to FIG. 3, components denoted by the reference numerals 1 to 4 and their functions are the same as those in Example 1. In addition to the structure of the optical waveguide device of Example 1, a silicon layer 5 made of amorphous silicon or polysilicon is formed on a surface of the support substrate 1. The silicon layer 5 can be formed by conventional thin film technology. The low refractive index layer 4 and the silicon layer 5 are bonded through direct bonding.

The optical waveguide device of this example was fabricated using the same material and thickness for each component as those in Example 1. The silicon layer 5 was formed on the support substrate 1 to a thickness of 0.5 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 3

Figure 4:
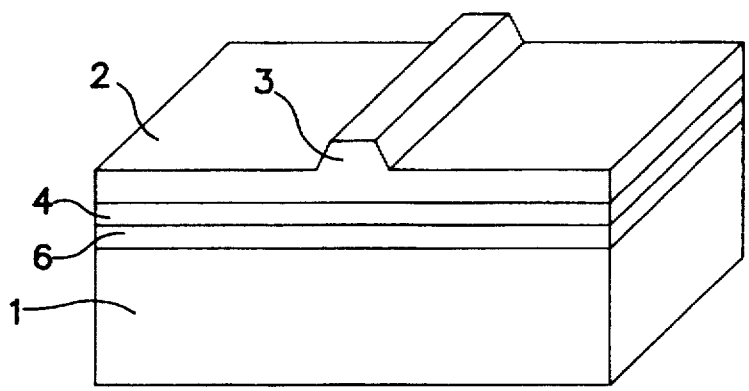

A third example of the optical waveguide device according to the present invention is shown in FIG. 4. Referring to FIG. 4, components denoted by the reference numerals 1 to 4 and their functions are the same as those in Example 1. In addition to the structure of the optical waveguide device of Example 1, a silicon compound layer 6 made of silicon oxide or silicon nitride is formed on a surface of the support substrate 1. The silicon compound layer 6 can be formed by a conventional thin film technology. The low refractive index layer 4 and the silicon compound layer 6 are bonded through direct bonding.

The optical waveguide device of this example was fabricated using the same material and thickness for each component as those in Example 1. The silicon compound layer 6 was formed on the support substrate 1 to a thickness of 0.5 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 4

Figure 5:
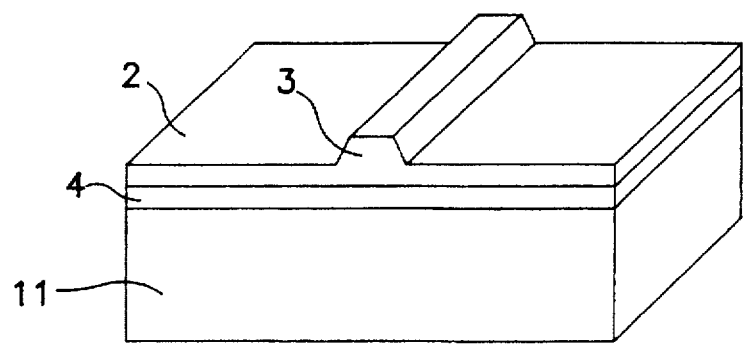

A fourth example of the optical waveguide device according to the present invention is shown in FIG. 5. Referring to FIG. 5, components denoted by the reference numerals 2 to 4 and their functions are the same as those in Example 1. In this example, an Si substrate 11, a semiconductor substrate, is used as the support substrate. The Si substrate 11 and the low refractive index layer 4 are bonded through direct bonding.

The optical waveguide device of this example was fabricated using the same material and thickness for each component as those in Example 1. The thickness of the Si substrate 11 was 450 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 5

Figure 6:
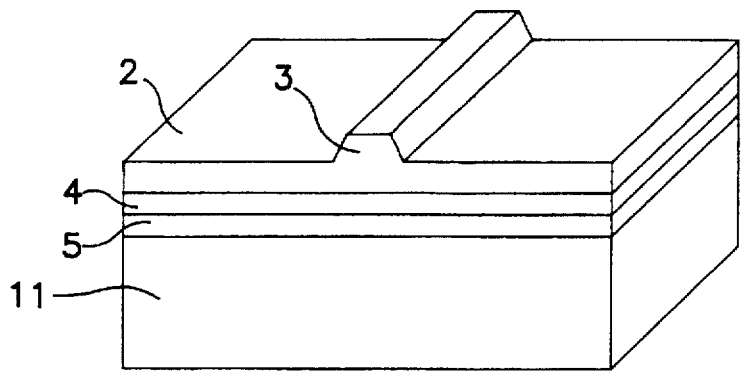

A fifth example of the optical waveguide device according to the present invention is shown in FIG. 6. Referring to FIG. 6, components denoted by the reference numerals 2 to 4 and 11, and their functions are the same as those in Example 4. In addition to the structure of the optical waveguide device of Example 4, a silicon layer 5 made of amorphous silicon or polysilicon is formed on a surface of the Si substrate 11. The low refractive index layer 4 and the silicon layer 5 are bonded through direct bonding.

The optical waveguide device of this example was fabricated using the same material and thickness for each component as those in Example 4. The silicon layer 5 was formed on the Si substrate 11 to a thickness of 0.5 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 6

Figure 7:
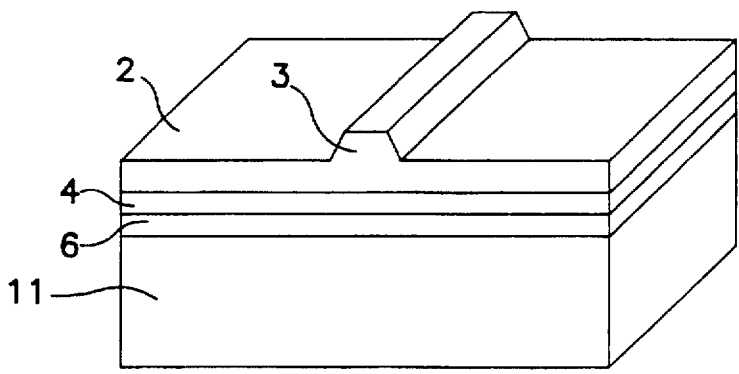

A sixth example of the optical waveguide device according to the present invention is shown in FIG. 7. Referring to FIG. 7, components denoted by the reference numerals 2 to 4 and 11, and their functions are the same as those in Example 4. In addition to the structure of the optical waveguide device of Example 4, a silicon compound layer 6 made of silicon oxide or silicon nitride is formed on a surface of the Si substrate 11. The low refractive index layer 4 and the silicon compound layer 6 are bonded through direct bonding.

The optical waveguide device of this example was fabricated using the same material and thickness for each component as those in Example 4. The silicon compound layer 6 was formed on the Si substrate 11 to a thickness of 0.5 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 7

Figure 8:
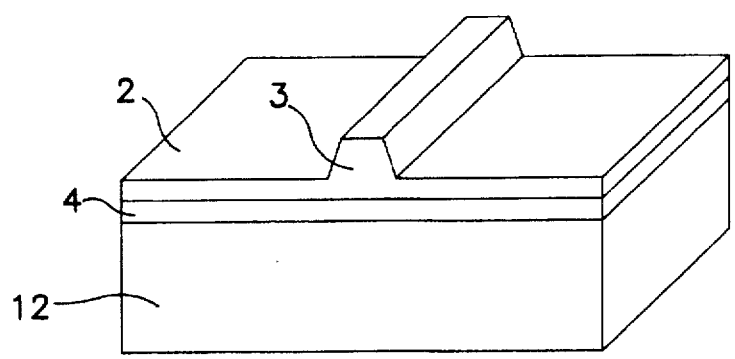

A seventh example of the optical wave-guide device according to the present invention is shown in FIG. 8. Referring to FIG. 8, components denoted by the reference numerals 2 to 4 and their functions are the same as those in Example 1. In this example, a GaAs or InP substrate 12, a III–V group compound semiconductor substrate, is used as the support substrate. The GaAs or InP substrate 12 and the low refractive index layer 4 are bonded through direct bonding.

The optical waveguide device of this example was fabricated using the same material and thickness for each component as those in Example 1. The thickness of the GaAs or InP substrate 12 was 450 μm. The loss of light during the propagation and the coupling loss with an optical fiber of the resultant optical waveguide device were measured under the same conditions as in Example 1. As a result, substantially the same favorable results as those in Example 1 were obtained.

EXAMPLE 8

Figure 9:
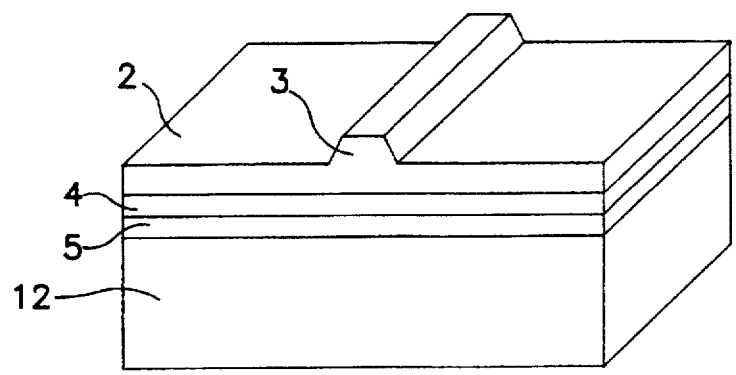

An eighth example of the optical waveguide device according to the present invention is shown in FIG. 9. Referring to FIG. 9, components denoted by the reference numerals 2 to 4 and 12, and their functions are the same as those in Example 7. In addition to the structure of the optical waveguide device of Example 7, a silicon layer 5 made of amorphous silicon or polysilicon is formed on a surface of the GaAs or InP substrate 12. The low refractive index layer 4 and the silicon layer 5 are bonded through direct bonding.

The optical waveguide device of this example was fabricated using the same materials and thicknesses for each component as those in Example 7. The silicon layer 5 was formed on the GaAs or InP substrate 12 to a thickness of 0.5 µm. The loss of light during the propagation and the coupling loss with an optical fiber of the resultant optical waveguide device were measured under the same conditions as in Example 1. As a result, substantially the same favorable results as those in Example 1 were obtained.

EXAMPLE 9

Figure 10:
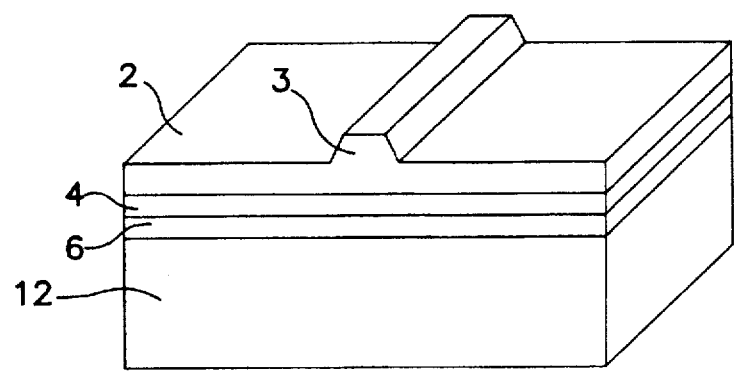

A ninth example of the optical waveguide device according to the present invention is shown in FIG. 10. Referring to FIG. 10, components denoted by the reference numerals 2 to 4 and 12, and their functions are the same as those in Example 7. In addition to the structure of the optical waveguide device of Example 7, a silicon compound layer 6 made of silicon oxide or silicon nitride is formed on a surface of the GaAs or InP substrate 12. The low refractive index layer 4 and the silicon compound layer 6 are bonded through direct bonding.

The optical waveguide device of this example was fabricated using the same material and thickness for each component as those in Example 7. The silicon compound layer 6 was formed on the GaAs or InP substrate 12 to a thickness of 0.5 µm. The loss of light during the propagation and the coupling loss with an optical fiber of the resultant optical waveguide device were measured under the same conditions as in Example 1. As a result, substantially the same favorable results as those in Example 1 were obtained.

EXAMPLE 10

Figure 11:
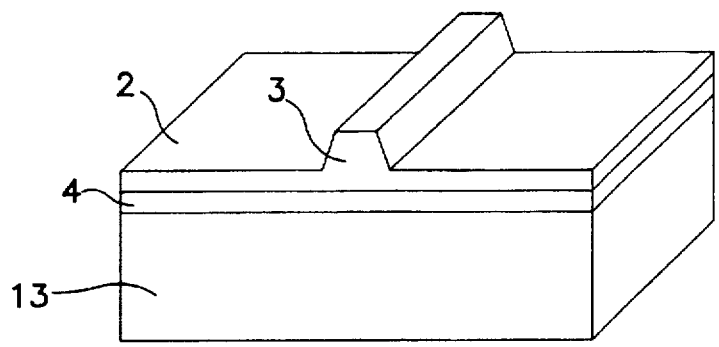

A tenth example of the optical waveguide device according to the present invention is shown in FIG. 11. Referring to FIG. 11, components denoted by the reference numerals 2 to 4 and their functions are the same as those in Example 1. In this example, a glass substrate 13 is used as the support substrate. The glass substrate 13 and the low refractive index layer 4 are bonded through direct bonding.

The optical waveguide device of this example was fabricated using the same material and thickness for each component as those in Example 1. The glass substrate 13 is made of high-purity quartz glass having a thickness of 450 µm and a refractive index of approximately 1.45 for light having a wavelength band of 1.5 µm. The loss of light during the propagation and the coupling loss with an optical fiber of the resultant optical waveguide device were measured under the same conditions as in Example 1. As a result, substantially the same favorable results as those in Example 1 were obtained.

EXAMPLE 11

Figure 12:
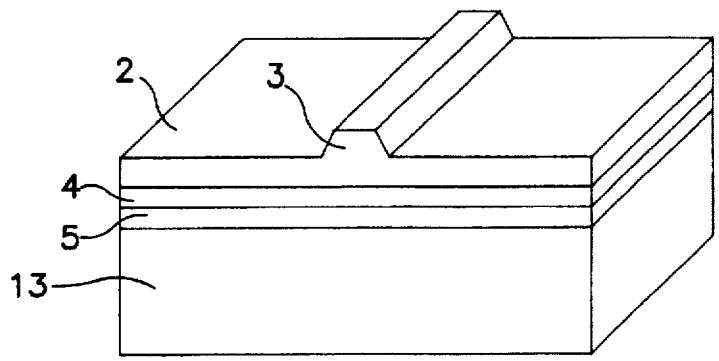

A eleventh example of the optical waveguide device according to the present invention is shown in FIG. 12. Referring to FIG. 12, components denoted by the reference numerals 2 to 4 and 13, and their functions are the same as those in Example 10. In addition to the structure of the optical waveguide device of Example 10, a silicon layer 5 made of amorphous silicon or polysilicon is formed on a surface of the glass substrate 13. The low refractive index layer 4 and the silicon layer 5 are bonded through direct bonding.

The optical waveguide device of this example was fabricated using the same materials and thicknesses for each component as those in Example 10. The silicon layer 5 was formed on the glass substrate 13 to a thickness of 0.5 µm. The loss of light during the propagation and the coupling loss with an optical fiber of the resultant optical waveguide device were measured under the same conditions as in Example 1. As a result, substantially the same favorable results as those in Example 1 were obtained.

EXAMPLE 12

Figure 13:
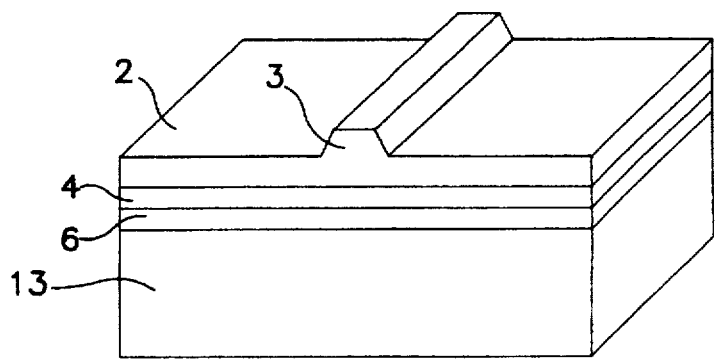

A twelfth example of the optical waveguide device according to the present invention is shown in FIG. 13. Referring to FIG. 13, components denoted by the reference numerals 2 to 4 and 13, and their functions are the same as those in Example 10. In addition to the structure of the optical waveguide device of Example 10, a silicon compound layer 6 made of silicon oxide or silicon nitride is formed on a surface of the glass substrate 13. The low refractive index layer 4 and the silicon compound layer 6 are bonded through direct bonding.

The optical waveguide device of this example was fabricated using the same materials and thicknesses for each component as those in Example 10. The silicon compound layer 6 was formed on the glass substrate 13 to a thickness of 0.5 µm. The loss of light during the propagation and the coupling loss with an optical fiber of the resultant optical waveguide device were measured under the same conditions as in Example 1. As a result, substantially the same favorable results as those in Example 1 were obtained.

EXAMPLE 13

Figure 14:
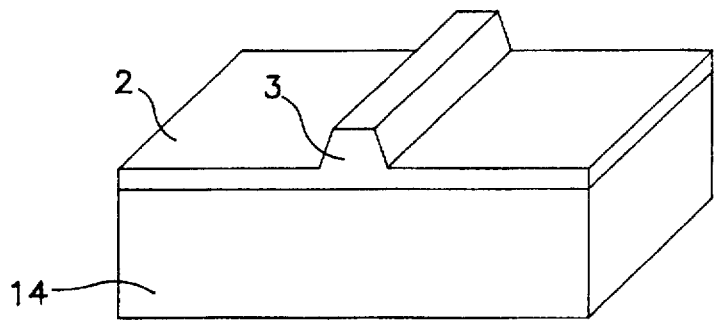

A thirteenth example of the optical waveguide device according to the present invention is shown in FIG. 14. Referring to FIG. 14, components denoted by the reference numerals 2 and 3 and their functions are the same as those in Example 1. In this example, a glass substrate 14 of which refractive index is lower than that of the glass substrate 2 having the optical waveguide portion 3 is used as the support substrate. The glass substrates 2 and 14 are bonded through direct bonding.

The optical waveguide device of this example was fabricated using high-purity quartz glass having refractive indices of 1.40 and 1.45 for light having a wavelength of 1.5 µm band for the glass substrate 14 as the support substrate and the glass substrate 2, respectively. The thicknesses of the glass substrate 14, the glass substrate 2 except the optical waveguide portion 3, and the optical waveguide portion 3 are 450 µm, 4 µm, and 10 µm, respectively. The loss of light during the propagation and the coupling loss with an optical fiber of the resultant optical waveguide device were measured under the same conditions as in Example 1. As a result, substantially the same favorable results as those in Example 1 were obtained.

EXAMPLE 14

Figure 15:
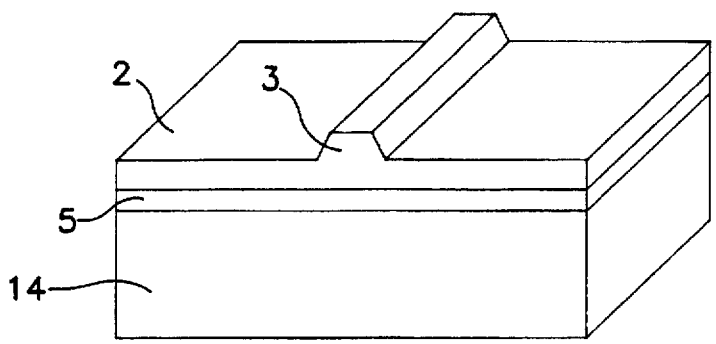

A fourteenth example of the optical waveguide device according to the present invention is shown in FIG. 15. Referring to FIG. 15, components denoted by the reference numerals 2, 3 and 14, and their functions are the same as those in Example 13. In addition to the structure of the optical waveguide device of Example 13, a silicon layer 5 made of amorphous silicon or polysilicon is formed on the surface of the glass substrate 14 as the support substrate. The glass substrate 2 and the silicon layer 5 are bonded through direct bonding.

The optical waveguide device of this example was fabricated using the same materials and thicknesses for each component as those in Example 13. The silicon layer 5 was formed on the glass substrate 14 to a thickness of 0.5 µm.

The loss of light during the propagation and the coupling loss with an optical fiber of the resultant optical waveguide device were measured under the same conditions as in Example 1. As a result, substantially the same favorable results as those in Example 1 were obtained.

EXAMPLE 15

Figure 16:
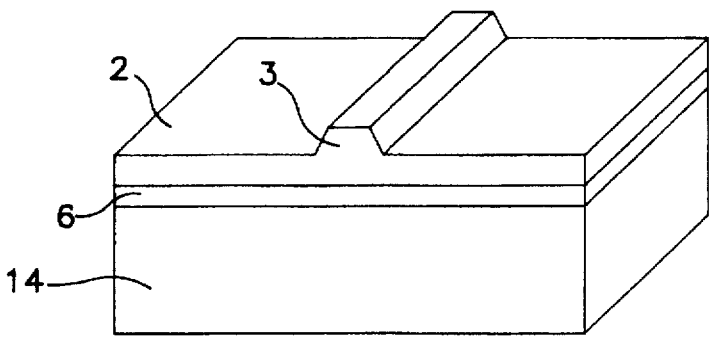

A fifteenth example of the optical waveguide device according to the present invention is shown in FIG. 16. Referring to FIG. 16, components denoted by the reference numerals 2, 3 and 14, and their functions are the same as those in Example 13. In addition to the structure of the optical waveguide device of Example 13, a silicon compound layer 6 made of silicon oxide or silicon nitride is formed on a surface of the glass substrate 14. The glass substrate 2 and the silicon compound layer 6 are bonded through direct bonding.

The optical waveguide device of this example was fabricated using the same materials and thicknesses for each component as those in Example 13. The silicon compound layer 6 was formed on the glass substrate 14 to a thickness of 0.5 μm. The loss of light during the propagation and the coupling loss with-an optical fiber of the resultant optical waveguide device were measured under the same conditions as in Example 1. As a result, substantially the same favorable results as those in Example 1 were obtained.

EXAMPLE 16

Figure 17:
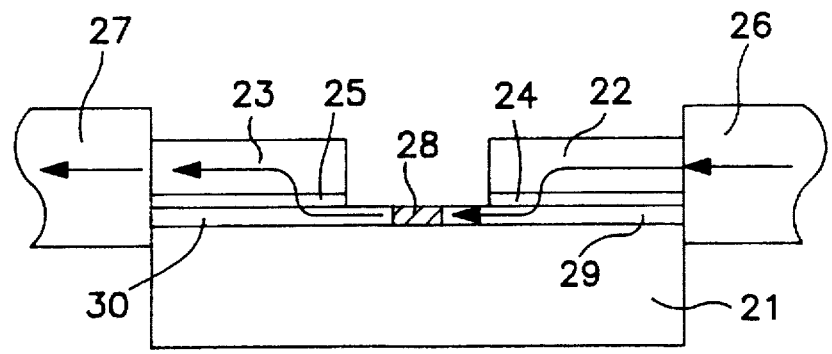

A sixteenth example of the optical waveguide device according to the present invention is shown in FIG. 17, which is a sectional view taken along optical waveguide portions of a glass substrate. Referring to FIG. 17, a dielectric support substrate 21 is made of lithium niobate or lithium tantalate which is a dielectric having the electrooptic effect. Optical waveguide portions 22 and 23 formed as a part of the glass substrate correspond to the optical waveguide portion 3 in Example 1. Optical fibers 26 and 27 are coupled to the optical waveguide portions 22 and 23. Low refractive index layers 24 and 25 are glass layers or other thin films having a refractive index lower than that of the optical waveguide portions 22 and 23. The low refractive index layers 24 and 25 can be formed by a conventional thin film technology. An optical device 28 such as a waveguide type optical modulator capable of using the electrooptic effect is formed on the dielectric support substrate 21. Optical waveguides 29 and 30 are formed on the dielectric support substrate 21, so as to form waveguide type optical directional couplers together with the optical waveguide portions 22 and 23 through the low refractive index layers 24 and 25, respectively. The optical waveguides 29 and 30 can be formed by a conventional thin film technology. The low refractive index layers 24 and 25 and the optical waveguides 29 and 30 are bonded through direct bonding.

The operation and function of the above-described optical waveguide device of this example will be described.

A light signal transmitted from outside through the optical fiber 26 is coupled to the optical waveguide portion 22 with a low coupling loss. The light signal is then guided to the optical directional coupler composed of the optical waveguide portion 22 and the optical waveguide 29.

The optical directional coupler is an optical device composed of two optical waveguides disposed in parallel with each other in which substantially all energy of light propagating in one optical waveguide can be transferred to the other when the light has propagated in the former optical waveguide by a predetermined distance. This is achieved by appropriately setting the distance between the two optical waveguides (vertical to the light propagation), the length of the optical waveguides (along the light propagation), the width thereof (vertical to the light propagation and along the substrate), and the thickness thereof (vertical to the substrate).

In this example, the optical directional coupler is formed by appropriately setting the shapes, sizes, and refractive indices of the optical waveguide portion 22, the low refractive index layer 24, and the optical waveguide 29 so that all of the light energy introduced to the optical waveguide portion 22 can be transferred to the optical waveguide 29. Accordingly, the light introduced from the optical fiber 26 can be transferred to the optical waveguide 29 with a significantly low loss of light. The optical waveguide 29 is coupled to the optical device 28 which is for example an optical modulator, where processing such as optical modulation is conducted.

The light output from the optical device 28 is then introduced into the optical waveguide 30. The optical waveguide 30 constitutes another optical directional coupler together with the optical waveguide portion 23 formed thereon with the low refractive index layer 25 interposed therebetween. The light energy propagating in the optical waveguide 30 is transferred to the optical waveguide portion 23 by the function as the optical directional coupler as described above. Then, the light is coupled to the optical fiber 27 with a low coupling loss to be transmitted outside.

Thus, the optical waveguide portion of the glass substrate and the dielectric substrate having the optical device capable of using the electrooptic effect can be optically coupled. This realizes the integration of the optical waveguide with an optical device which can provide a high-level function. More specifically, the optical waveguide portion of the glass substrate can have the shape, size, and refractive index matched with those of the optical fiber. Therefore, the coupling loss can be significantly reduced compared with the case where the optical fiber is coupled to an optical waveguide formed in a material having a large refractive index such as lithium niobate and lithium tantalate. Further, the optical waveguide portion of the glass substrate produces a significantly low loss of light during the propagation therethrough compared with the optical waveguide formed in the dielectric substrate. According to this example, such an optical waveguide can be integrally formed with an optical device made of dielectric materials having an electrooptic effect with high efficiency. Further, since the low refractive index layers 24 and 25 and the optical waveguides 29 and 30 are bonded through direct bonding, it is possible to fabricate the optical waveguide device with a precision in a fraction of the wavelength of the light.

EXAMPLE 17

Figure 18:
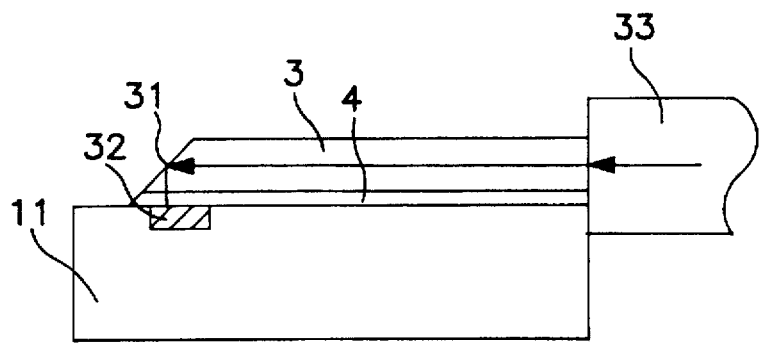

A seventeenth example of the optical waveguide device according to the present invention is shown in FIG. 18, which is a sectional view taken along an optical waveguide portion of a glass substrate. Referring to FIG. 18, components denoted by the reference numerals 3, 4 and 11, and their functions are the same as those in Example 4. In this example, an end reflecting portion 31 is formed on an end face of the optical waveguide portion 3, and a photodiode 32 is formed in the Si substrate 11. An optical fiber 33 is coupled to the optical waveguide portion 3. The structures of the optical waveguide portion 3, the low refractive index layer 4, and the Si substrate 11 are the same as those in Example 4. The low refractive index layer 4 is bonded through direct bonding with the Si substrate 11.

A light signal transmitted from outside through the optical fiber 33 is coupled to the optical waveguide portion 3 with a low coupling loss. The light signal propagating in the optical waveguide portion 3 is then reflected by the end reflecting portion 31 formed on the other end of the optical waveguide portion 3 toward the Si substrate 11. According to this example, the photodiode 32 is formed in a portion of the Si substrate 11 where the light is incident, so that the light signal introduced into the optical waveguide portion 3 can be converted into an electrical signal.

With the above structure, the optical waveguide portion of the glass substrate and the optical device in the Si semiconductor substrate can be optically coupled. This realizes the integration of the optical waveguide with an optical device which can provide a high-level function. Though not shown in FIG. 18, an electronic device such as various types of transistors may also be formed in a portion of the Si substrate 11 other than the portion where the photodiode 32 is formed, so that the electric signal converted from the light signal can be amplified. Thus, according to this example, the optical waveguide with a low loss of light during the propagation and a low coupling loss can be integrally formed with an Si semiconductor electrooptic circuit with high efficiency.

EXAMPLE 18

Figure 19:
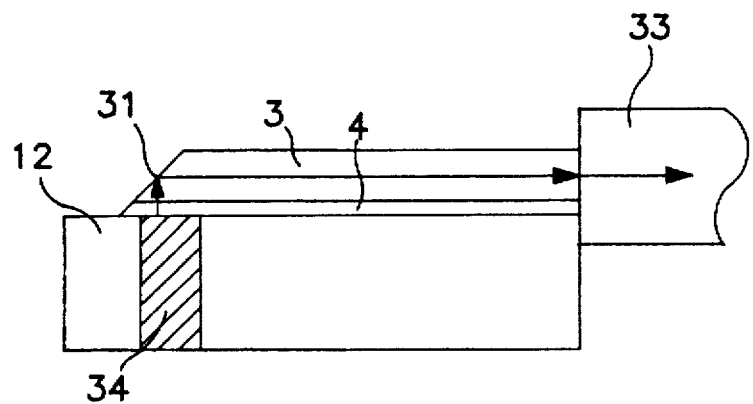

An eighteenth example of the optical waveguide device according to the present invention is shown in FIG. 19, which is a sectional view taken along an optical waveguide portion of a glass substrate. Referring to FIG. 19, components denoted by the reference numerals 3, 4 and 12, and their functions are the same as those in Example 7. In this example, the end reflecting portion 31 is formed on an end face of the optical waveguide portion 3 as in Example 17, and a surface emitting type semiconductor laser 34 is formed in the GaAs or InP substrate 12. The optical fiber 33 is coupled to the optical waveguide portion 3. The structures of the optical waveguide portion 3, the low refractive index layer 4, and the GaAs or InP support substrate 12 are the same as those in Example 7. The low refractive index layer 4 is bonded through direct bonding with the GaAs or InP substrate 12.

A light signal generated by the semiconductor laser 34 is reflected by the end reflecting portion 31 toward the optical waveguide portion 3, and then transmitted outside through the optical fiber 33 coupled to the optical waveguide portion 3 with a low coupling loss.

With the above structure, the optical waveguide portion of the glass substrate and the GaAs or InP substrate can be optically coupled. This realizes the integration of the optical waveguide with an optical device which can provide a high-level function. Though not shown in FIG. 19, an electronic device such as various types of transistors may also be formed in a portion of the GaAs or InP substrate 12 other than the portion where the semiconductor laser 34 is formed, so as to provide a function for operating the semiconductor laser 34. Thus, according to this example, the optical waveguide with a low loss of light during the propagation and a low coupling loss can be integrally formed with a GaAs or InP semiconductor electrooptic circuit with high efficiency.

EXAMPLE 19

Figure 20:
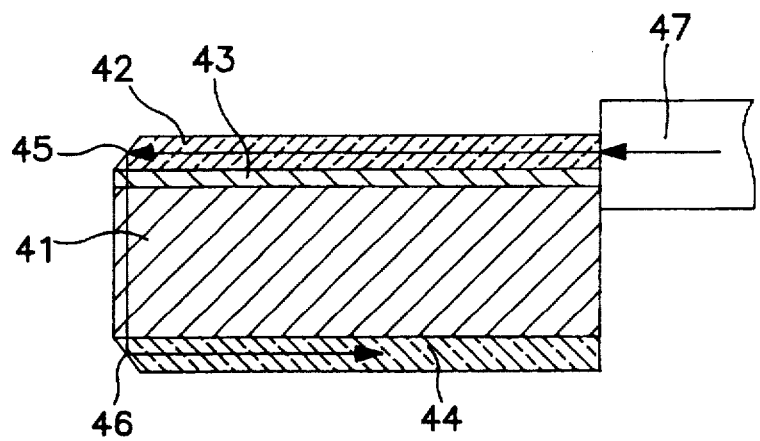

An nineteenth example of the optical waveguide device according to the present invention is shown in FIG. 20, which is a sectional view taken along an optical waveguide portion of a glass substrate. Referring to FIG. 20, on the upper surface of a first glass substrate 41 as the support substrate, a second glass substrate is formed with a low refractive index layer 43 interposed therebetween. The second glass substrate includes an optical waveguide portion 42 as part thereof. The low refractive index layer 43 has a refractive index lower than that of the second glass substrate. An optical waveguide 44 is formed on the bottom surface of the first glass substrate 41. End reflecting portions 45 and 46 are formed on end faces of the optical waveguide portion 42 and the optical waveguide 44, respectively, so that they oppose to each other. An optical fiber 47 is coupled to the optical waveguide portion 42. The first glass substrate 41 and the low refractive index layer 43 are bonded through direct bonding.

A light signal transmitted from outside through the optical fiber 47 is coupled to the optical waveguide portion 42 with a low coupling loss. The light signal introduced into and propagating in the optical waveguide portion 42 is optically coupled to the optical waveguide 44 through the end reflecting portions 45 and 46 with a significantly low loss.

The optical waveguide 44 may be formed on the bottom surface of the first glass substrate 41 before the bonding by a conventional method such as Ti diffusion. The end reflecting portions 45 and 46 can be formed by processing the end faces of the glass substrates before the bonding into a shape inclined at an appropriate angle such as 45° by grinding or the like, so as to form an optical reflecting film by which all of the propagating light signals can be reflected at an angle such as 45°.

With the above structure, the light signal can be transferred to the optical waveguide across the substrate. Thus, the optical waveguide device can be provided with a high-level function.

EXAMPLE 20

Figure 21:
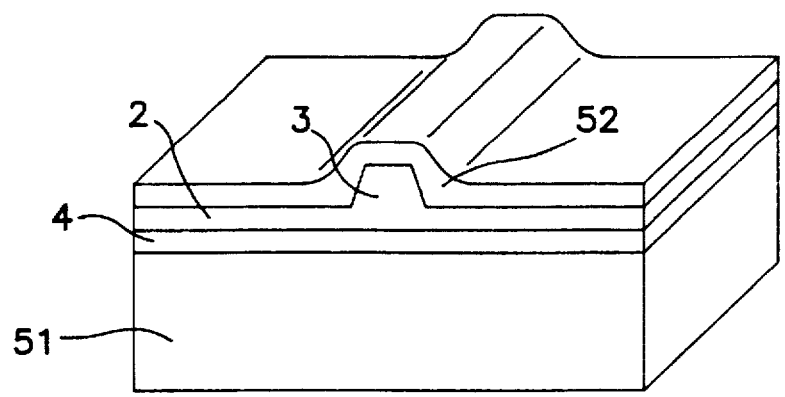

A twentieth example of the optical waveguide device according to the present invention is shown in FIG. 21. Referring to FIG. 21, components denoted by the reference numerals 2 to 4, and their functions are the same as those in Example 1. A support substrate 51 can be made of any of the materials described in the preceding examples including a dielectric such as lithium niobate and lithium tantalate, glass, and a semiconductor. On the entire surface of the glass substrate 2 including the optical waveguide portion 3, a clad layer 52 having a refractive index lower than that of the optical waveguide portion 3 is formed. The clad layer 52 is practically made of silicon oxide or silicon nitride which can be easily formed by chemical vapor deposition or the like.

With the above structure in which the optical waveguide portion is sandwiched by the layers with a low refractive index, light can be more effectively confined in the optical waveguide portion 3, and thus can be more easily coupled to an optical fiber.

EXAMPLE 21

Figure 22:
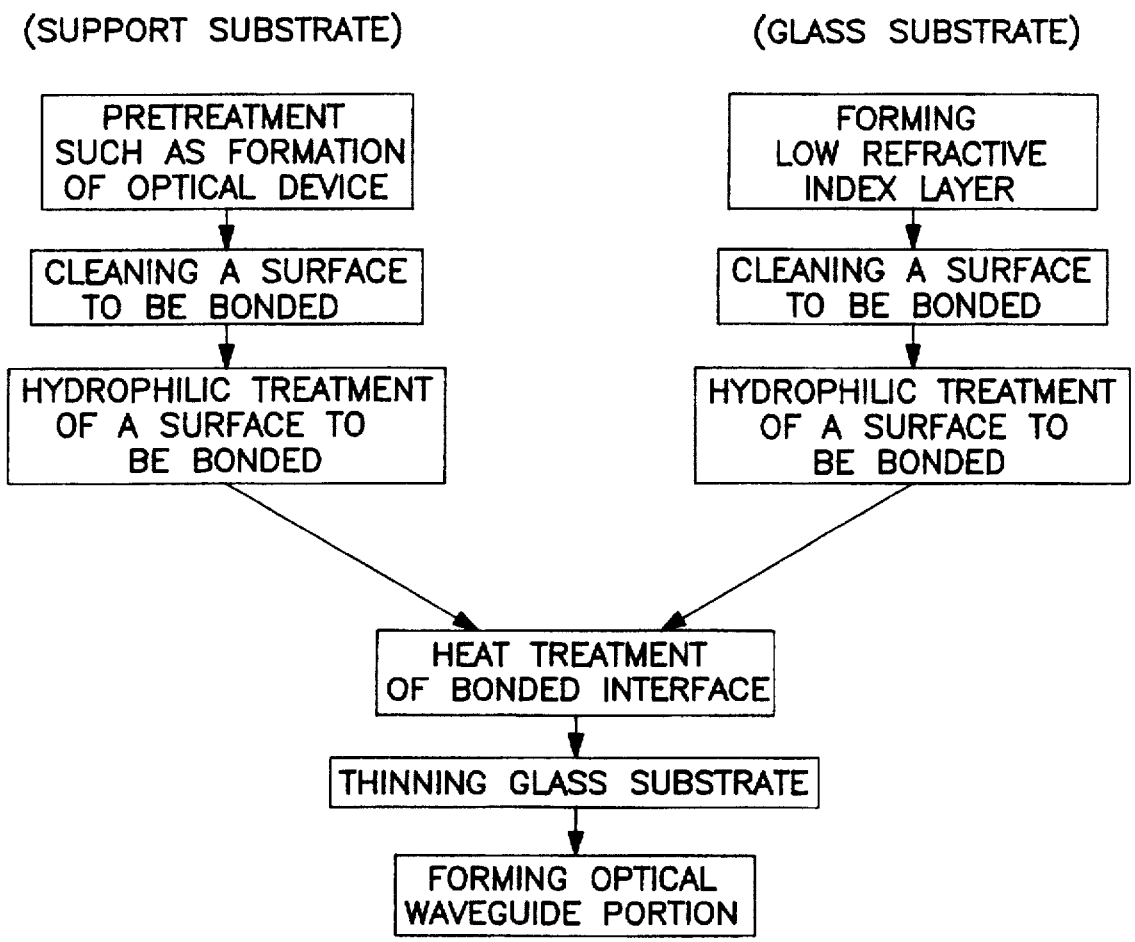
FIG. 22 is a production flow chart of a fabricating method according to the present invention.

A first example of the method for fabricating the optical waveguide device according to the present invention will be described with reference to the production flow chart shown in FIG. 22.

First, a surface of a support substrate which is to be bonded with a glass substrate is sufficiently cleaned. The cleaned surface is then subjected to a hydrophilic treatment. When the support substrate is made of a dielectric such as lithium niobate and lithium tantalate, glass, or an Si semiconductor, the surface of the support substrate can be made hydrophilic by slightly etching the surface using a hydrofluoric acid etchant and then immersing it in an ammonia/hydrogen peroxide solution. When the support substrate is a GaAs or InP semiconductor, the surface is made hydrophilic by a process similar to the above using, in this case, a sulfuric acid/hydrogen peroxide etchant for the etching of the surface. Thereafter, the support substrate is immersed in pure water to be cleaned. By this hydrophilic treatment, hydroxyl groups are generated on the surface of the support substrate and adsorb water molecules, making the surface highly hydrophilic.

As for the glass substrate having an optical waveguide portion, a layer made of glass, silicon oxide, or silicon nitride having a refractive index lower than the material of the glass substrate is formed on the glass substrate by chemical vapor deposition or the like, as required. Thereafter, the surface of such a layer is cleaned and subjected to the hydrophilic treatment. The process of the hydrophilic treatment on this layer is substantially the same as that on the support substrate described above.

The above two hydrophilic surfaces of the support substrate and the low refractive index layer formed on the glass substrate are then attached to each other. They are bonded through direct bonding by the hydrogen bond among the hydroxyl groups and the adsorbed water molecules on the surfaces. The bonded surfaces are then heated. By this heat treatment, the adsorbed water molecules are gradually desorbed from the bonded interface. As a result, the direct bonding is further strengthened by the hydrogen bond among the surface hydroxyl groups and the covalent bond formed due to the desorption of the water molecules and the condensation of the hydrogen-bonded hydroxyl groups. The strength of the direct bonding depends upon the materials of the substrates. Some material may provide a bonding strength large enough for a practical use, so that only one substrate can be subjected to the hydrophilic treatment. There is also a material capable of providing a bonding strength large enough for a practical use without being heated.

After the direct bonding, the surface of the glass substrate can be thinned to a predetermined thickness by grinding, cutting, etching, or the like.

Subsequently, an optical waveguide is formed. This is performed by etching the glass substrate so as to obtain a portion thereof which is thicker than the other portion, or by diffusing a substance having a high refractive index in a portion of the glass substrate so as to increase the refractive index of the portion compared with the other portion. In the former method, a photolithographic technology is employed so as to form a resist on the portion of the glass substrate where the optical waveguide is to be formed and, using the resist as a mask, the other portion is etched to be made thinner, thus forming a ridge-type optical waveguide. In the latter method, a layer of metal such as Ti is formed on the portion where the optical waveguide is to be formed by vacuum evaporation or photolithography, and then the metal is diffused by heat treatment. The diffused portion has a refractive index higher than the other portion, so that an optical waveguide can be formed. The optical waveguide can be formed into any shape so as to obtain a desired type of the optical waveguide device.

The typical shape, size, and refractive index of each component are as described in Example 1. The initial thickness of the glass substrate is preferably large enough to be durable for handling and to be easily made thinner. Such a thickness is generally in the range of 100 to 1000 μm.

The heat treatment for strengthening the direct bonding is effective at 100° C. or more. The temperature can be raised so far that it does not exceed the softening point of the glass substrate used. A temperature close to 1000° C. is possible by using materials with a high softening temperature and a high melting point if the thermal expansions of the support substrate and the glass substrate are matched. It is also possible to enhance the bonding strength at a lower temperature by applying a high electric field to the bonded interface at the heat treatment.

By this direct bonding, the surface of the substrate can be sufficiently made flat, which makes it easier to precisely control the thickness of each portion at a later thinning process. Further, since a wide range of materials can be used for the glass substrate, the optical waveguide device with a low loss of light during the propagation and a low coupling loss as described in the preceding examples can be obtained. Since a bulk material is used for the optical waveguide portion, the resultant optical waveguide device is excellent in the characteristics and reproducibility, and suitable for mass production, compared with the case of forming an optical waveguide by a thin film technology.

EXAMPLE 22

A second example of the method for fabricating the optical waveguide device according to the present invention will be described.

First, a process requiring a temperature higher than that at a later heat treatment for the direct bonding is conducted. This includes a series of processes for forming an electronic device and an optical device including a diffusion process. Thus, an electronic device such as a photodiode and an optical device such as an optical modulator and an optical waveguide are formed in predetermined portions in the support substrate.

Then, a silicon layer or a silicon compound layer is formed on a surface of a support substrate by chemical vapor deposition or sputtering. The silicon may be polysilicon or amorphous. The silicon compound may be silicon oxide or silicon nitride. The film thickness is approximately 0.5 μm, for example.

Then, as described in Example 21, the exposed surface of the silicon layer or the silicon compound layer is sufficiently cleaned and subjected to the hydrophilic treatment. Thereafter, process similar to those described in Example 21 is conducted, so as to obtain the optical waveguide device as shown in preceding examples such as Examples 2 and 3.

EXAMPLE 23

A third example of the method for fabricating the optical waveguide device according to the present invention will be described.

In this example, in addition to the method of Example 21, an end reflecting portion is formed on an end face of a glass substrate having a low refractive index layer formed thereon. To form end reflecting portion, the end face is processed into an inclined shape at an appropriate angle by grinding or the like before the direct bonding. An antireflection coating is then formed on the inclined face by vacuum evaporation or the like. The antireflection coating selectively reflects light having a predetermined wavelength to allow such light to propagate in the optical waveguide, while preventing light having the other wavelength from reflecting therefrom.

Thereafter, the glass substrate and a semiconductor substrate as the support substrate are bonded through direct bonding as described in Example 21 so that, in this case, the end reflecting portion can be properly positioned with regard to the semiconductor substrate, for example, above a photodiode formed in the semiconductor substrate. An optical waveguide portion is also formed as described in Example 21. In this way, an optical waveguide device as shown in Examples 17, 18 and 19 can be obtained in which the optical waveguide portion and an optical device in the support substrate are optically coupled.

The angle of the inclined face is 45°, for example, and a multi-layer film made of silicon oxide/titanium oxide can be used for the antireflection coating.

In the above examples, GaAs or InP was used as the III–V group compound semiconductor for the support substrate. Other III–V group compound semiconductors such as AlGaAs and InGaAsP can also be used instead of GaAs and InP since the chemical properties of the surfaces of these semiconductors are significantly similar to one another.

The sizes of the components shown in the above examples are only illustrative and not restrictive.

In the above examples, the ridge-type optical waveguide formed by thickening a portion of the glass substrate compared with the other portion was shown. However, other types of optical waveguides can also be formed by other technologies including the diffusion of ions such as Ti and proton exchanging.

Thus, the structure and the method according to the present invention have advantages as follows:

(1) The glass optical waveguide can be integrally formed on a dielectric substrate having the electrooptic effect or on a semiconductor substrate having an electronic device and an optical device. Since the glass optical waveguide can be optically coupled with the optical device formed in the dielectric substrate, the dielectric optical device having an excellent response and controllability can be coupled with an optical fiber with a low coupling loss.

(2) Substantially any glass materials can be used for the optical waveguide. Accordingly, by properly selecting the glass material, an optical waveguide device with a significantly low loss of light during the propagation can be achieved. Further, by properly selecting the glass material, the refractive indices of the optical waveguide and the optical fiber can be matched, allowing it to obtain an optical waveguide device with a low coupling loss.

(3) An optical waveguide having a sectional shape similar to that of the core portion of the optical fiber can be formed. Also, since a bulk material is used, the optical waveguide can be thicker, compared with the case of forming an optical waveguide by a thin film technology. This results in markedly enhancing the productivity of the resultant optical waveguide device.

(4) Since no adhesive agent or the like is used for any bonding through the fabrication of the optical waveguide device, sizes can be precisely controlled during the process, providing an optical waveguide device with excellent properties. Further, since no organic material is used, the resultant optical waveguide device is excellent in the temperature characteristics, environmental resistance, and reliability.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating an optical waveguide device comprising the steps of:

providing a support substrate having a first surface and a second surface opposing each other and a glass substrate having a first surface and a second surface opposing each other;

exposing the first surface of the support substrate and the second surface of the glass substrate to a hydrophilic treatment;

attaching the first surface of the support substrate and the second surface of the glass substrate to each other;

heating the attached support substrate and the glass substrate;

thinning the glass substrate to a predetermined thickness; and forming an optical waveguide in the thinned glass substrate.

2. A method for fabricating an optical waveguide device according to claim 1 further comprising before the hydrophilic treatment a step of:

forming a thin film layer on at least one of the first surface of the support substrate and the second surface of the glass substrate.

3. A method for fabricating an optical waveguide device according to claim 2, wherein the thin film layer is a silicon layer or a silicon compound layer.

4. The method for fabricating an optical waveguide device according to claim 1 wherein the step of heating the attached support substrate and the glass substrate is carried out at a temperature of at least 100° C.

5. The method for fabricating an optical waveguide device according to claim 1 wherein the glass substrate is thinned to a predetermined uniform thickness.

* * * * *